Nov. 4, 1952  D. W. OSMUN  2,616,731
PACKING UNIT
Filed June 24, 1948

INVENTOR.
Dean W. Osmun
BY
E. V. Hardway
ATTORNEY

Patented Nov. 4, 1952

2,616,731

UNITED STATES PATENT OFFICE 2,616,731

PACKING UNIT

Dean W. Osmun, Houston, Tex.

Application June 24, 1948, Serial No. 34,857

4 Claims. (Cl. 286—26)

This invention relates to a packing unit.

An object of the invention is to provide a packing unit specially designed for use to form a fluid tight seal between two relatively movable parts and wherein the packing element formed of rubber or other resilient material, will be protected against injury.

Another object of the invention is to provide a packing unit which includes a resilient seal ring with split metal retaining rings confining the seal ring and with continuous, annular guards between the seal ring and the retaining rings which will shield the seal ring and protect it against injury. Other objects and advantages will be apparent from the following specification which is illustrated in the accompanying drawings wherein—

Figure 2:
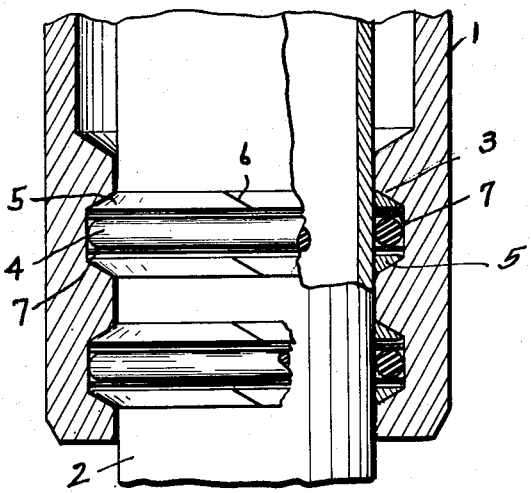
Figure 2 is an enlarged, elevational view, partly in section, illustrating the unit.
Figure 1:
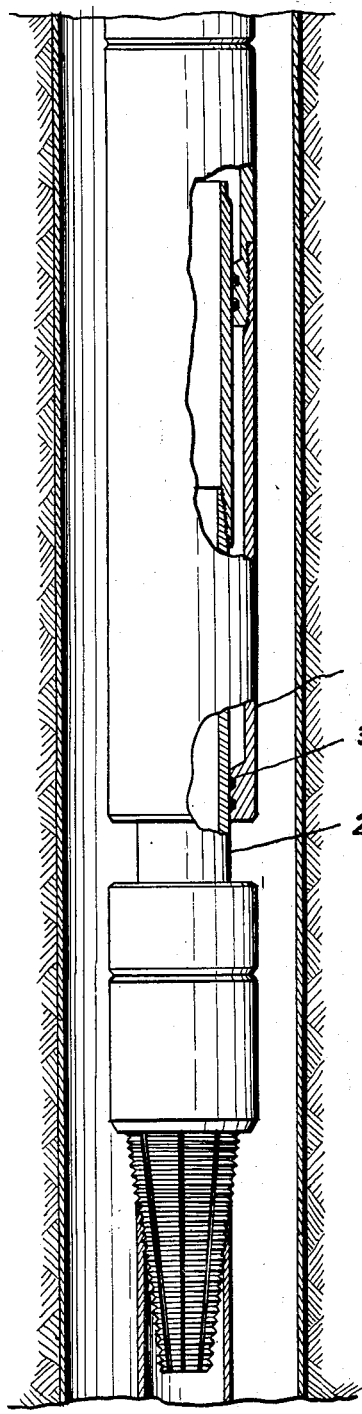
Figure 1 is a side elevation, partly in section, of a well tool employing the packing unit.
Figure 3:
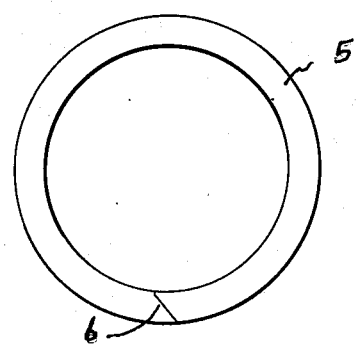
Figure 3 is a plan view of a retaining ring employed.

Referring now more particularly to the drawings wherein like numerals of reference designate similar parts in each of the figures, the numerals 1 and 2 designate outer and inner members respectively which are relatively movable and between which the sealing assembly is located.

One of these members, the outer one in the present illustration, is provided with an annular groove or seat 3 to receive a resilient seal ring 4 which fits closely around the other of said members.

In the present illustration the groove 3 is inwardly flared and on opposite sides of the seal ring 4 are the split rings 5, 5 which are shaped to fit into the groove 3 on opposite sides of the seal ring 4.

It will be noted that the rings 5 are split at 6 so that they may be contracted in inserting them into the seat 3.

On opposite sides of the resilient seal ring 4 there are the continuous guard rings 7, 7. These guard rings prevent the seal ring 4 from coming into contact with the ends of the split retaining rings 5. Otherwise as the parts are relatively moved, particularly when the seal ring is subjected to high pressure, the seal ring would be injured by the ends of the rings 5 and gradually a leak would develop; but the rings 7, 7 being continuous shield the seal ring and prevent it from coming into contact with the retaining rings 5, particularly the ends of the retaining rings where they are split.

In assembling the unit one of the split rings 5 is contracted and inserted into the groove or seat. A guard ring 7 is then inserted. This guard ring is of relatively thin but tough material so that it can be distorted and inserted into place and it will then assume its original normal shape. The seal ring 4 is then inserted into the seat 3 against the previously inserted guard ring. The other guard ring is then inserted as above explained and thereafter the other split ring 5 is contracted and inserted into the seat. The inner sides of the retaining rings 5 preferably are formed with flat parallel faces so as to fit against the guard rings and in a preferred form the outer sides of the retaining rings are tapering to conform to the contour of and to fit against the sides of the groove or seat 3, as clearly shown in Figure 2.

The seal ring 4 will thus be protected even when it is subjected to high pressure or when it seals between relatively movable parts, the guard rings 7 shielding the seal ring from contact with the retaining rings 5 and particularly with the ends of said retaining rings.

While the packing unit has been illustrated in connection with the longitudinally movable parts of a special type of well tool it is to be understood that it is capable of general use for forming a seal between two parts whether they are stationary or relatively movable and particularly where the seal is subjected to high pressure.

In case the packing unit is subjected to pressure from one side only the guard ring 7, on the pressure side may be dispensed with and thus only one guard ring employed.

The drawings and description are illustrative merely while the broad principle of the invention will be described by the appended claims.

What I claim is:

1. The combination with inner and outer telescoping movable parts, said outer part having an internal annular groove whose entire surface is integrally formed, a seal ring in said groove and in contact with the other part, continuous guard rings in the groove one on each side of said seal ring and formed of thin deformable material and a split retaining ring in the groove on the outer side of each guard ring.

2. The combination with inner and outer telescoping movable parts, said outer part being formed with an internal annular groove having both side walls integral with the bottom wall thereof, of a continuous resilient seal ring in the groove and in contact with the inner part, a thin, deformable guard ring formed in one continuous piece in the groove on each side of the seal ring the outside and inside diameters of each guard ring being substantially the same as the outside and inside diameters of the seal ring, and a split retaining ring in the groove on the outerside of and in engagement with each guard ring, said guard rings and split rings having substantially equal engaging faces.

3. The combination with inner and outer telescoping movable parts, said outer part being formed with an internal, annular, inwardly flared groove having both side walls integral with the bottom wall thereof, of a continuous resilient seal ring in the groove and in contact with the inner part, a deformable guard ring formed in one continuous piece of thin, flexible metal in the groove on each side of the seal ring, and a split retaining ring in the groove on the outer side of each guard ring, said retaining rings being formed with parallel faces fitting against the guard rings and tapered sides conforming to the sides of the groove.

4. The combination with inner and outer telescoping movable parts, said outer part having an internal annular groove whose entire surface is integrally formed, of a continuous resilient seal ring in the groove and in contact with the inner part, a thin, deformable guard ring formed in one continuous piece in the groove on one side of the seal ring the outside and inside diameters of the guard ring being substantially the same as the outside and inside diameters of the seal ring, and a split retaining ring in the groove on the opposite side of and in engagement with the guard ring, said guard ring and split ring having substantially equal engaging faces.

DEAN W. OSMUN.

REFERENCES CITED

The following references are of record in the file of this patent:

UNITED STATES PATENTS

| Number | Name | Date |
|---|---|---|
| 430,313 | Ensign et al. | June 17, 1890 |
| 2,151,356 | Queen | Mar. 21, 1939 |
| 2,349,170 | Jackman | May 16, 1944 |
| 2,427,789 | Kehle | Sept. 23, 1947 |
| 2,456,356 | Aber | Dec. 14, 1948 |
| 2,462,586 | Whittingham | Feb. 22, 1949 |

FOREIGN PATENTS

| Number | Country | Date |
|---|---|---|
| 10,596 | Great Britain | of 1885 |